United States Patent [19]

Bergemann et al.

[11] Patent Number: 4,480,663
[45] Date of Patent: Nov. 6, 1984

[54] PNEUMATIC RELAY VALVE

[75] Inventors: Klaus-Dieter Bergemann, Hanover; Karl-Heinz Deike, Pattensen; Bernd-Joachim Kiel, Wunstorf; Heinz-Werner Konig, Barsinghausen, all of Fed. Rep. of Germany

[73] Assignee: Wabco Fahrzeugbremsen GmbH, Hanover, Fed. Rep. of Germany

[21] Appl. No.: 417,300

[22] Filed: Sep. 13, 1982

[51] Int. Cl.³ .............................................. B60T 15/22
[52] U.S. Cl. ..................... 137/627.5; 303/40
[58] Field of Search ................ 137/85, 116.3, 596.18, 137/627.5; 303/28, 29, 40

[56] References Cited

U.S. PATENT DOCUMENTS

| | | | |
|---|---|---|---|
| 2,969,802 | 1/1961 | Rich | 137/85 |
| 3,078,716 | 2/1963 | Winters | 137/85 |
| 3,491,785 | 1/1970 | Kay | 137/85 |
| 3,770,019 | 11/1973 | Stelzer | 137/85 |
| 3,927,916 | 12/1975 | Masuda | 137/627.5 |
| 4,118,076 | 10/1978 | Mild | 303/28 |
| 4,134,418 | 1/1979 | Woodcock | 137/627.5 |

Primary Examiner—Martin P. Schwadron
Assistant Examiner—Mark Malkin
Attorney, Agent, or Firm—J. B. Sotak

[57] ABSTRACT

The invention relates to a pneumatic relay valve for regulating output pressure in proportion to a control pressure.

The relay valve includes a first piston member which is acted on by the control pressure and a second piston member which is acted on by the input pressure.

A compression spring is located between the two relay piston members.

The strength of the compression spring determines the height of a predetermined minimum controlled pressure even if the input pressure is subsequently lost or drops to a low value.

In addition, the output pressure of a receiver can be maintained at a specific adjustable level which may be below the maximum pressure value of the input pressure due to the compression spring located between the two relay piston members.

10 Claims, 3 Drawing Figures

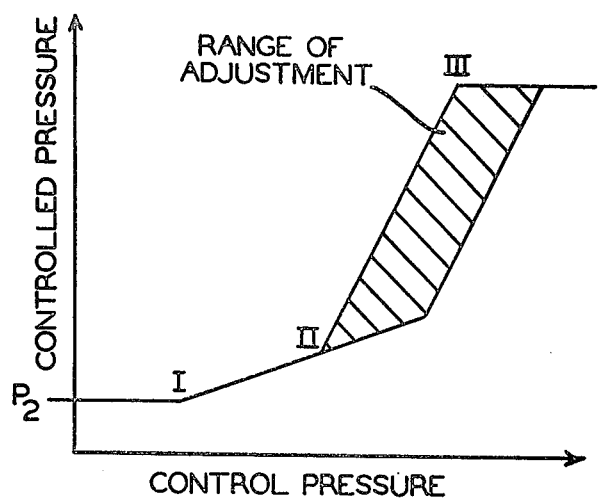

PNEUMATIC RELAY VALVE

FIELD OF THE INVENTION

This invention relates to a relay valve and more particularly to a fluid pressure valve device which regulates the output pressure in accordance with a control pressure and includes a pair of spring-biased piston members to establish an initial minimum receiver pressure.

BACKGROUND OF THE INVENTION

In the past, relay valves were used on occasion to ventilate compressed air cylinders and couplings in motor vehicles to shorten the application and response times.

A well known relay valve described in WABCO publication "Description of Compressed Air Devices in Motor Vehicles", April 1978 edition, page 83, Relay valve 973 001, included a fluid pressure inlet, a fluid pressure outlet, a control inlet and an exhaust outlet. A relay piston separates a primary control chamber which is connected with the control inlet from a secondary control chamber connected with the fluid pressure outlet. An inlet chamber which is able to be connected with a source of fluid supply pressure by the fluid pressure inlet in which a multi-way valve is located. By means of this valve, the secondary control chamber either can be supplied with a fluid pressure from the supply source or can be vented to the atmosphere.

The multi-way valve has an operative connection with the relay piston. The relay piston is acted upon either by the control pressure of the control chamber or by the delivery pressure in the secondary control chamber.

When the force of the control pressure in the primary chamber exceeds the force of the delivery pressure in the secondary control chamber, the multi-way valve opens the connection from the inlet chamber to the secondary control chamber so that the air in the receiver is pressurized.

If there is equilibrium between the forces acting on the relay piston, namely, the pressure in the primary control chamber is equal the pressure in the secondary control chamber, the multi-way valve closes and the pressure in the receiver is maintained at a given level. If the pressure in the first control chamber falls, the second control chamber and the receiver are exhausted.

It will be appreciated that relay valves of this type offer the possibility of providing an output pressure which follows the characteristics of the control pressure. In instances where there is a significant difference in the size of the two control or working surfaces of the relay piston which are acted upon by the pressures, it is also possible to vary the controlled pressure though it is higher or lower than the control pressure.

Further, as a rule, relay valves of this type exhibit a linear characteristic. Therefore, such relay valves are not universally usable unless additional special measures are taken in certain applications. For instance, if pressure response changes, and a nonlinear characteristic exists, it is necessary to maintain at a predetermined constant or near constant delivery pressure value when the control pressure only varies slightly. Then, after a predetermined pressure value has been exceeded, the delivery pressure and the control pressure follow a linear characteristic having a predetermined slope and may be handled by the usual relay valves.

OBJECTS AND SUMMARY OF THE INVENTION

For this reason, it is an object of this invention to provide a unique relay valve which is capable of maintaining a predetermined constant pressure level in a predetermined adjustable initial range of control pressure.

It is a further object of this invention is to provide a pneumatic relay valve having a two-piece spring-biased piston for regulating the output pressure in accordance with the control pressure.

Another object of this invention is to provide a fluid pressure relay valve which includes a first piston being acted upon by a control pressure, and includes a second piston being acted upon by an input supply pressure to maintain a given initial pressure level.

This invention offers the advantage of maintaining the pressure within a receiving device at one level for a specifically adjustable range of the control pressure by providing a pair of relay piston elements and by placing a spring element between the two elements of the relay piston. This pressure lies below the maximum pressure value supplied by a source of fluid pressure.

The height of the pressure value maintained during the pressure holding phase is varied.

According to the present invention, there is provided a relay valve for regulating an output pressure in accordance with a control pressure comprising:
(a) a valve housing having at least one inlet port connectable to a source of supply pressure, at least one outlet port connectable to a receiver, and at least one control inlet connected to a source of control pressure, and having first and second control chambers,
(b) a first relay piston member located in said first control chamber and having a first effective surface acted upon by said control pressure, a second relay piston member located in said second control chamber and having a second effective surface acted upon by said supply pressure,
(c) a supply pressure inlet chamber connected with said supply pressure inlet port,
(d) said supply pressure inlet chamber connectable with said second control chamber by a multi-way valve,
(e) said second control chamber connectable with atmosphere by said multi-way valve,
(f) a compression spring disposed between said first and second relay piston members,
(g) said second relay piston member operatively connected to said multi-way valve.

DESCRIPTION OF THE DRAWINGS

The above objects and other attendant features and advantages will be better understood by referring to the following detailed description when considered in conjunction with the accompanying drawings, wherein:

FIG. 3 is a response curve of the controlled pressure versus the control pressure where the pressure regulation occurs in three steps.

DETAILED DESCRIPTION OF THE INVENTION

Figure 1:
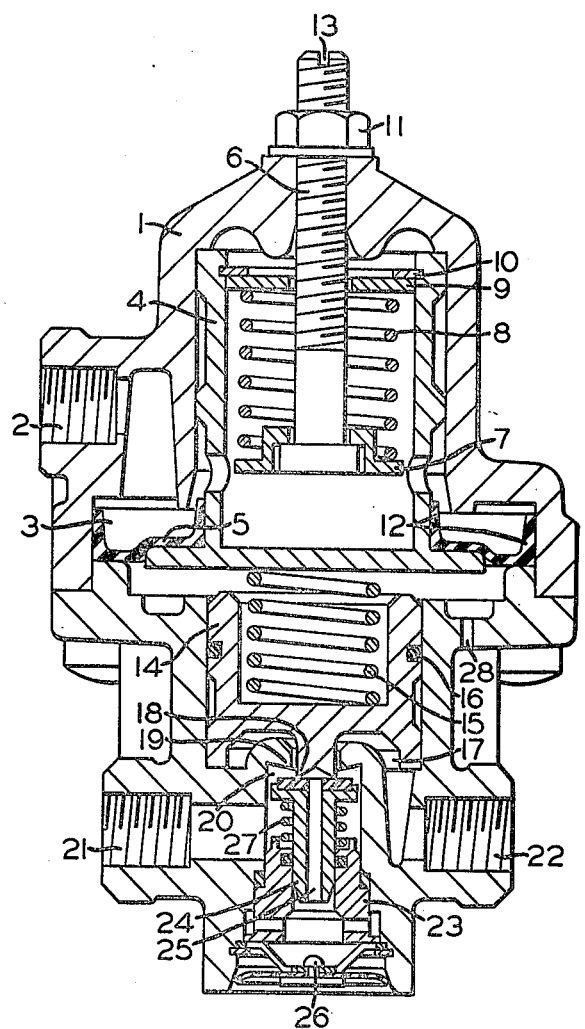
FIG. 1 is a sectional elevational view of a fluid pressure relay valve having a control inlet port connectable to a source of control pressure and a pressure inlet port connectable to a source of fluid supply pressure for regulating the controlled pressure at an outlet port which is connected to a receiver.

Referring now to the drawings, and in particular to FIG. 1, there is shown a relay valve having a housing 1. A control inlet port 2 is located in the upper portion of the valve housing 1. The inlet port 2 is connected to a first control chamber 3. The control chamber 3 is varied by a first reciprocable relay piston member 4. The relay piston 4 is constructed as a hollow cylindrical member which is internally suspended in the housing 1 by a flexible annular diaphragm 5. The rubber diaphragm 5 includes enlarged inner and outer flanges 12. The inner flange of the diaphragm 5 seals and is attached to the outer wall of the relay piston 4 while the outer flange effectively seals and is secured to the inner wall of a center bore formed in valve housing 1. An adjustable threaded bolt 6 is screwed into a taphole located on the top of the valve housing 1. The bottom end of the bolt 6 fits into the hollow relay piston member 4. The lower end of the bolt 6 is connected to retaining washer 7 which is disposed within relay piston portion 4.

The other or top end of the threaded bolt 6 is provided with a screwdriver slot 13 which is for adjustment purpose. A primary compression spring 8 has its lower end abutting the upper side of the spring retaining washer 7 and has the other or upper end abutting the underside of another spring retaining washer 9. The spring retaining washer 9 is held in place by a snap ring 10 which is snapped into an annular groove formed in the inner wall of the relay piston body 4. A self-sealing lock nut 11 is screwed onto the upper end of the threaded bolt 6 which protrudes out of the top of valve housing 1. The initial compressive force of the compression spring 8 is adjusted by turning the threaded bolt 6 with a screwdriver which is inserted into slot 13. A cylindrical bore is located in the valve housing below the first relay piston member 4. A second reciprocable relay piston member 14 is located within the bore and is biased downwardly by the force of a second compression spring 15. The compression spring 15 fits into the hollow body of piston 14 and is trapped between the upper side of the floor of the second relay piston body 14 and the underside of the floor of the first relay piston member 4. A sealing O-ring 16 is fitted into an annular groove formed in the outer peripheral surface of the second relay piston body 14. The rubber ring 16 seals off a compartment from the area between the first relay piston member 4 and the second relay piston member 14. The sealed compartment serves as a second control chamber 17 which is varied by the second relay piston member 14. The second relay piston 14 includes an integral extension formed on the side adjacent the second control chamber 17 which serves as exhaust valve seat 18. The extension seat 19 protrudes into the fluid pressure inlet chamber 20 through an opening formed in a wall portion inlet located in the lower end of housing 1. The rim of the apertured wall portion serves as an inlet valve seat 19. The pressure inlet chamber 20 is connected via port 21 to a suitable source of fluid pressure, such as a supply reservoir (not shown), and is connected to a load device, such as a receiver (not shown), by means of outlet port 22. A tubular body member 23 is installed in the fluid pressure inlet chamber 20. The member 23 includes a central bore running in a longitudinal direction which serves as the guide sleeve for a double seated or multi-way shut-off valve 24. The body of the double seated shut-off valve 24 includes a longitudinal center bore 25 which is connectable to the second control chamber 17 as well as to the pressure release device 26 which is mounted in the bottom end of the valve housing 1. A third compression spring 27 is situated between the annular guide 23 and the top of the double seated valve member 24. Thus, the double seated valve 24 is biased upwardly against the exhaust valve seat 18.

In order to avoid an air dampening effect, it is advantageous to vent the area under diaphragm 5, namely, the space between the relay pistons 14, 4 to atmosphere via a bore hole 28.

Figure 2:
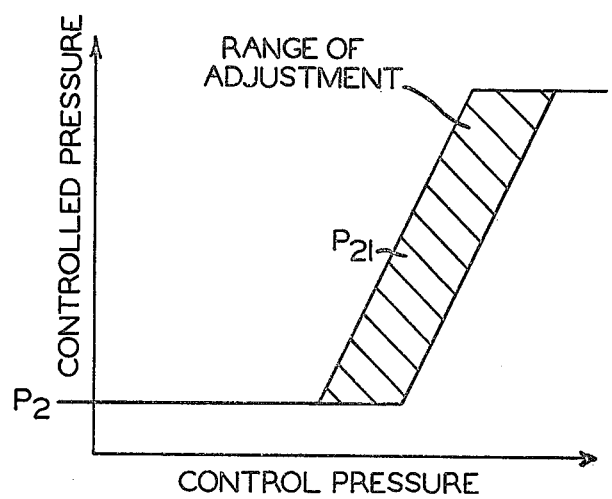
FIG. 2 is a response curve of the controlled pressure versus the control pressure of the relay valve of FIG. 1.

In describing the operation of the present relay valve, it will be helpful to refer to the curves of FIGS. 2 and 3 which show the controlled pressure versus the control pressure. Let us assume that the first control chamber 3 is being pressurized by air from a first air source which is connected to the inlet control port 2. It will be appreciated that the force of the compression spring 15 acts through the piston 14 to normally hold the inlet valve members 19, 24 in an open position. Further, the spring 15 presses the double seated shut-off valve 24 against the compression spring 27. In addition, let us assume that at the same time, pressurized air is being supplied from the fluid pressure reservoir to the inlet port 21. Thus, air flows from port 21 to the pressure intake chamber 20, through the opened valve 24, past the inlet valve seat 19 into the second control chamber 17 and to the port 22 which is connected to the receiver. The exhaust valve 26 and seat 18 of the double-seated shut-off valve will be held closed during this phase by the second relay piston 14 which is forced downwardly by the second compression spring 15.

If the build-up of controlled pressure in the second control chamber 17 rises to the point where it moves the relay piston member 14 upwardly against the compression spring 15, the double seated shut-off valve 24 will follow due to the compressive force of the spring 27. That is, when the inlet pressure reaches level P, the valve 24 will seat and seal against the inlet valve seat 19 so that the pressure in chamber 20 is shut-off from the second control chamber 17. Thus, it will be seen that the pressure in the outlet receiver will remain at this cut-off level, namely, at pressure P2 as shown in FIG. 2. Now, as the control pressure builds-up in the first control chamber 3, the first relay piston member 4 will begin to move downwardly against the forces of the compression springs 8 and 15. Thus, the first piston member 4 moves in the direction towards the second relay piston member 14. Now, when the first relay piston member 4 engages the second relay piston member 14, the piston extension will move in the direction towards the fluid pressure inlet chamber 20. The bottom extension portion of the second relay piston member 14 will cause the double seated shut-off valve 24 to become unseated from the inlet valve seat 19.

Thus, the reservoir pressure appearing at inlet chamber 20 is directly conveyed to the second control chamber 17 which is in communication with the receiver. Accordingly, the controlled pressure follows the control pressure as shown by curve portion P21 of FIG. 2.

The pressurized air continues to be channeled into the second control chamber 17 and also into the output receiver until the pressure in the second control chamber 17 reaches a point where an equilibrium exists between the opposing forces acting on the relay piston members 4 and 14. Then, the inlet valve members 19, 24 again close, but the controlled pressure in the receiver will remain at the level at which it was at the time the inlet valve closed.

Now when the control pressure in the first control chamber 3 drops, the first relay piston member 4 will be displaced by the first compression spring 8 in an upward direction. Thus, the tension loading on the second compression spring 15 of the second relay piston member 14 is decreased. If the pressure in the first control chamber 3 reaches a value which is below the value of the controlled pressure in the output receiver, the second relay piston member 14 will be moved in the direction toward the first relay piston member 4 by the pressure in the second control chamber 17. The exhaust valve seat 18 will be lifted from the double seated shut-off valve 24 so that the exhaust valve members 18, 24 will become opened. Thus, the output receiver is vented to the outside air through the bore 25 and the pressure release device 26. When the pressure in the receiver and in the second control chamber 17 is exhausted to a value which corresponds to the force of the second compression spring 15, the exhaust valve seat 18 will again become seated by the double seated shut-off valve 24, and the exhaust valve members 18, 24, 25 will become closed. The air pressure supply to the receiver remains undisturbed since the inlet valve members 24, 19 are also closed.

The pressure in the output receiver is not changed until the double valve seat members 18, 19, 24, 25 are again activated by the first control chamber 3. When the pressure in the output receiver will be changed.

It will be appreciated that the lowering of the control pressure in the first control chamber 3 causes a pressure to be channeled into the second control chamber 17 and thereby into the output receiver, where it is maintained. The initial pressure level is dependent on the dimensions and characteristics of the second compression spring which is disposed between the two relay piston members 4, 14.

By subdividing the relay piston into two distinct parts 4 and 14 and by placing a compression spring between the two relay piston members 4 and 14, it is possible to ensure that a predetermined minimum pressure is always available at the output receiver even in the case of a loss of the reservoir pressure or in instances where the pressure is too low.

It will be appreciated that the width of the range of adjustment is determined by the amount of linear movement that is obtainable by turning the threaded bolt 6 either all the way in or all the way out to set the lower and upper limits.

Now if the spring 8 which acts upon the first relay piston member 4 is made weaker than the compression spring 15 between the relay piston members 4, 14, a pressure distribution like that shown by the curve of FIG. 3 is obtained. When control pressure acts on the first relay piston member 4, the pressure opposes the force of the compression spring 8.

Thus, the controlled pressure P2 is maintained constant for this phase up to break point I. If the control pressure in the first control chamber 3 continues to rise further, the first relay piston member 4 is shifted towards the second relay piston member 14 and thereby changes the initial stress of the compression spring 15 which acts upon the relay piston member 14. The controlled pressure P2 begins to rise as shown in the characteristic curve of FIG. 3 from break point I. If the control pressure in the first control chamber 3 has sufficiently risen to the point where the first relay piston member 4 engages the second relay piston member 14 after overcoming the force of compression spring 15, the controlled pressure P2 follows characteristic curve break point II wherein the effective surfaces of both relay piston members 4 and 14 are equalized by the pressures.

Now when the second relay piston member 14 and the first relay piston member 4 are shifted upwardly within the housing, inlet valve members 19, 24 are closed and the controlled pressure is maintained constant in accordance with the characteristic curve from break point III.

It will be appreciated that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

Having thus described our invention, what we claim as new and desire to secure by Letters Patent, is:

1. A relay valve for regulating an output pressure in accordance with a control pressure comprising:
   (a) a valve housing having at least one inlet port connectable to a source of supply pressure, at least one outlet port connectable to a receiver, and at least one control inlet connected to a source of control pressure, and having first and second control chambers,
   (b) a first relay piston member located in said first control chamber and having a first effective surface acted upon by said control pressure, a second relay piston member located in said second control chamber and having a second effective surface acted upon by said supply pressure,
   (c) supply pressure inlet chamber connected with said supply pressure inlet port,
   (d) said supply pressure inlet chamber connectable with said second control chamber by a multi-way valve having an initially opened inlet valve,
   (e) said second control chamber connectable with atmosphere by said multi-way valve which has an initially closed exhaust valve,
   (f) a compression spring disposed between said first and second relay piston members for ensuring that a predetermined pressure level is available at the outlet port, and
   (g) said second relay piston member operatively connected to said multi-way valve for closing said inlet valve when the pressure in said second control chamber reaches said predetermined pressure level.

2. The relay valve as defined in claim 1, wherein said first relay piston member includes a flexible diaphragm for sealing said first control chamber.

3. The relay valve as defined in claim 1, wherein said second relay piston member includes an O-ring for sealing said second control chamber.

4. The relay valve as defined in claim 1, wherein said first relay piston member is biased by an additional compression spring which is directly opposed to the force of said control pressure in the control chamber.

5. The relay valve as defined in claim 4, wherein said additional compression spring which acts upon the first relay piston member is weaker than the compression spring which is located between said first and second relay piston members.

6. The relay valve as defined in claim 4, wherein said additional compression spring which acts upon the first relay piston member is stronger than the compression spring which is located between said first and second relay piston members.

7. The relay valve as defined in claim 4, wherein said additional spring of said first relay piston member is adjustable to vary the range of operation of said control pressure in said first control chamber.

8. The relay valve as defined in claim 1, wherein said multi-way valve is a double seated shut-off valve.

9. The relay valve as defined in claim 8, wherein said double seated shut-off valve opens communication between said one inlet port to said one outlet port via said second control chamber to establish an initial minimum pressure in the receiver.

10. The relay valve as defined in claim 8, wherein said double seated shut-off valve includes a compression spring for biasing said valve toward its seats.

* * * * *